May 31, 1949.  H. PAPRITZ  2,471,652
OPHTHALMIC PERIMETER COMPRISING AN ARTIFICIALLY
ILLUMINATED CONCAVE SPHERICAL REFLECTOR
Filed Sept. 29, 1945
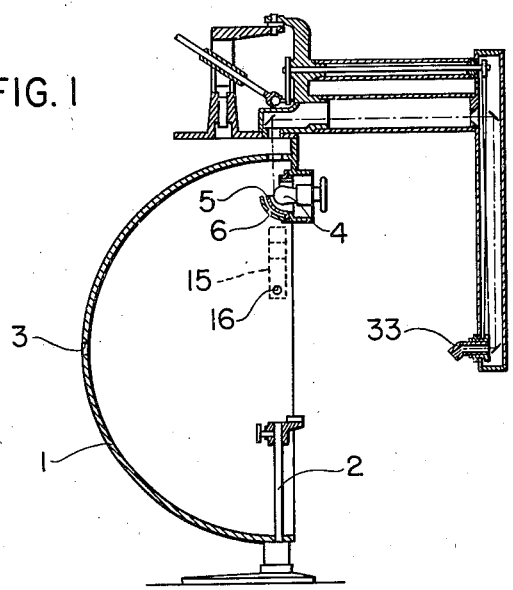
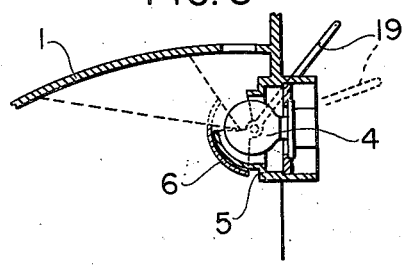
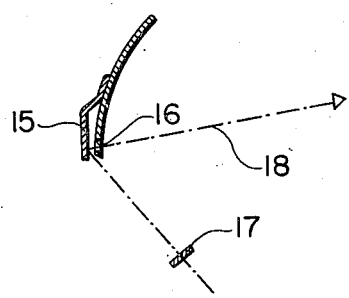
INVENTOR
Hans Papritz
BY
ATTORNEYS Patented May 31, 1949

2,471,652

UNITED STATES PATENT OFFICE 2,471,652

OPHTHALMIC PERIMETER COMPRISING AN ARTIFICIALLY ILLUMINATED CONCAVE SPHERICAL REFLECTOR

Hans Papritz, Berne, Switzerland, assignor to Haag-Streit Werkstatten fur Prazisionsmechanik, Berne-Liebefeld, Switzerland Application September 29, 1945, Serial No. 619,354
In Switzerland October 14, 1944

1 Claim. (Cl. 88—20)

The invention relates to artificially illuminated concave spherical reflectors for use in eye examining apparatus, the concave surface of the reflector serving as field area for the sight mark of the testing instrument used, which may be a perimeter or other suitable instrument.

According to the invention the reflector has attached to it at least one source of artificial light located outside the field of vision, so disposed that it directly illuminates one part of the spherical surface, whence the remainder of that surface is illuminated by diffused light.

One example of the perimeter is illustrated diagrammatically in the accompanying drawings in which:

Fig. 1 is a vertical section of the instrument.

Fig. 2 is a partial section showing the comparison screen and

Fig. 3 is a sectional view of the means for adjusting the screen which is combined with the lamps.

Referring first to Fig. 1 the hemispherical bowl I has a uniformly diffusing coating on its inner surface, and at 2 there is a chin support for the patient. At 3 there is a hole for observation of the patient's eyeball by the oculist.

Outside the patient's field of vision, at the top of the bowl, there is an electric lamp 4, screened from below by a fixed reflector 5 and throwing its light on to a portion of the inner surface of the bowl near the rim at the top. Thence the light is diffused uniformly over the remainder of the said inner surface, but an adjustable screen 6 rotatably mounted between the bowl I and the lamp 4 enables the intensity of the illumination to be varied. This screen 6 may be adjusted by means of a lever 19 as shown in Fig. 3.

The lamp 4 may serve also as a source of light for a projector 33 as described in the specification left with our co-pending application Serial No. 619,355, now Patent 2,441,031, May 4, 1948, its purpose being to project a light mark on to the inner surface of the bowl and swinging said light mark to and fro on said inner surface for special testing of the patient's field of vision.

When using the projector with a bowl such as shown in Fig. 1 for producing the test marks on the inner surface of the bowl I, it is important to be able to regulate the relative strengths of the light thrown on to the inner surface of the bowl by the lamp 4 and by the said projector respectively. This may be done by means of a photometer device operating on the balance principle, such as the device shown in Fig. 2. Near the rim of the bowl I there is a hole 16 with a sharp rim, and behind this hole is fixed a comparison screen 15 of the same albedo as the inner surface of the bowl. Light from the projector is projected on to this comparison screen after passing through a grey filter 17 which reduces its intensity to a predetermined degree. A view of the comparison screen being taken through the aperture 16, in the direction 18, the brightness of the inner surface of the bowl is reduced by means of the adjustable screen 6 till the aperture 16 is no longer distinguishable, the brightness of the inner surface of the bowl having become equal to that of the comparison screen 15. On removal of the filter 17 the projector accordingly projects a test mark on the inner surface of the bowl illuminated by the lamp 4 to only a fraction of the brightness of the said test mark.

What I claim is:

An ophthalmic perimeter comprising a stationary hemispherical bowl having a diffusely reflexing inner surface, means for projecting a test mark on any desired part of said inner surface, an electric lamp mounted inside said bowl near the rim of the bowl and outside the field of vision of the eye to be examined, a fixed reflector for said lamp reflecting the latter's light on the inner surface of said bowl to produce a uniform diffuse illumination of the entire remainder of the inner surface of the bowl, an adjustable screen for said lamp to vary the intensity of said diffuse illumination, a fixed comparison screen mounted outside of the bowl near the rim portion thereof at a short distance from the outer surface of said bowl opposite an aperture in said rim portion of the bowl, the inner surface of said comparison screen having the same albedo as the inner surface of said bowl and being adapted to receive light of controlled intensity from a source outside of said bowl whereby on manipulation of the adjustable screen the intensity of the diffuse illumination of the inner surface of the bowl can be reduced to the value of the illumination of the comparison screen.

HANS PAPRITZ.

REFERENCES CITED

The following references are of record in the file of this patent:

UNITED STATES PATENTS

| Number | Name | Date |
|---|---|---|
| 1,795,752 | Bauersfeld et al. | Mar. 10, 1931 |
| 1,942,850 | Tillyer | Jan. 9, 1934 |
| 2,045,704 | Ferree et al. | June 30, 1936 |
| 2,374,854 | Feinbloom | May 1, 1945 |